United States Patent [19]

Sugita

[11] Patent Number: 5,757,766

[45] Date of Patent: May 26, 1998

[54] TRANSMITTER AND RECEIVER FOR ORTHOGONAL FREQUENCY DIVISION MULTIPLEXING SIGNAL

[75] Inventor: Takehiro Sugita, Kanagawa, Japan

[73] Assignee: Sony Corporation, Tokyo, Japan

[21] Appl. No.: 650,266

[22] Filed: May 22, 1996

[30] Foreign Application Priority Data

May 31, 1995 [JP] Japan .................................. 7-158615

[51] Int. Cl.$^6$ .................................................. H04K 1/10
[52] U.S. Cl. ............................................. 370/206; 375/261
[58] Field of Search .................................... 370/206, 209, 370/205, 207, 208, 211, 212, 213, 214, 215, 320, 330, 344, 441, 436, 479, 478; 375/235, 237, 238, 239, 267, 275, 278, 205, 208, 209, 210, 279, 281, 261, 298, 329, 260, 308

[56] References Cited

U.S. PATENT DOCUMENTS 5,488,632   1/1996   Mason et al. ..................... 370/208
5,537,396   7/1996   Kanda et al. ..................... 370/479

Primary Examiner—Dang Ton
Attorney, Agent, or Firm—Jay H. Maioli

[57] ABSTRACT

In a communication system, the energy of each bit of the inputted information bit string is diffused over the whole frequency band of the orthogonal carriers, and the energy of the plural bits is multiplexed onto each orthogonal carrier. As a result, even though frequency selective fading has occurred remarkable attenuation value of the energy of each bit is some remarkable degrading of the error rate can be alleviated, and changing of the data rate can be easily accommodated by modifying the number of the code multiplexing. In this way, a communication system can be realized which is able to alleviate the performance deterioration due to frequency selective fading, and to easily cope with a modification of the data rate.

16 Claims, 8 Drawing Sheets

TRANSMITTER AND RECEIVER FOR ORTHOGONAL FREQUENCY DIVISION MULTIPLEXING SIGNAL

BACKGROUND OF THE INVENTION

Description of the Related Art

Heretofore, there has been proposed the orthogonal frequency division multiplexing system (OFDM) as a mobile communication system for transmitting data with a high data rate. In this system, plural orthogonal carriers whose phases are mutually orthogonal are used concurrently to perform digital modulation of information data, and then modulated signal is transmitted. This system is used in a digital radio broadcasting in Europe which is referred to as digital audio broadcast (DAB), and also expected as a transmitting system of the next generation high-definition television.

Hereupon, the OFDM system is explained referring to FIGS. 1 and 2.

In an OFDM system transmitting apparatus 1, information data (information bit string) S1 which is to be transmitted is first inputted to a serial-parallel converter (S/P) 2, as shown in FIG. 1. The serial-parallel converter 2 converts the inputted information data S1 into parallel data strings, in accordance with the modulation multivalued number. In this connection, if the modulation system is binary phase shift keying (BPSK) then the modulation multivalued number becomes "1", and if it is quadrature phase shift keying (QPSK) then the modulation multivalued number becomes "2", and if it is 8-phase phase-shift keying (8-phase PSK) then the modulation multivalued number becomes "3", and if it is quadrature amplitude modulation (16 QAM) then the modulation multivalued number becomes "4".

A modulator 3 produces orthogonal phase signals according to the stated modulation system, on the basis of the inputted parallel data strings. This orthogonal phase signals are inputted to a serial-parallel converter (S/P) 4, and converted, in this place, into parallel data strings in accordance with the number of orthogonal carriers.

An inverse Fourier transformer (IFFT) 5 transforms the inputted parallel data strings into a signal of a time-base region, and outputs it as a transmission signal S2. This transmission signal S2 is converted into a signal which has the desired carrier frequency band in a frequency converter 6, and then amplified to the stated electric power in a high-frequency amplifier 7, and radiated on the air through an antenna 8.

On the other hand, as shown in FIG. 2, in an OFDM system receiving apparatus 9, the reception signal which has been received with an antenna 10 is amplified in a high-frequency amplifier 11, converted into a base-band signal S3 by a frequency converter 12, and then inputted to a Fourier transformer (FFT) 13. The Fourier transformer 13 extracts orthogonal phase components in respective orthogonal carriers from the inputted base-band signal S3, and outputs the extracted phase components to a parallel-serial converter (P/S) 14. The parallel-serial converter 14 converts the inputted plural orthogonal phase components into serial. A demodulator 15 performs demodulation with respect to the orthogonal phase components which have been converted into serial. At this time, the data which is obtained through the demodulator 15 is a form of parallel data strings (that is, information symbols) corresponding to the modulation multivalued number; therefore, by converting it into a serial data string by means of a parallel-serial converter (P/S) 16, the information data S4 can be obtained.

This OFDM system has such a feature that the length of the symbol is long (for instance, several tens [µS]) because plural orthogonal carriers are used concurrently, and so it is little influenced by inter-symbol interference based on multipath. Particularly, if guard-time is inserted among symbols subsequently to inverse Fourier transformation on the transmitting side, then the influence can be perfectly eliminated, so it can be said that it is an extremely well suited communication system for mobile communication.

By the way, in the case of the OFDM system, because frequency bandwidth of each carrier is narrow, influence which is based on frequency selective fading (that is, temporal fluctuation of received power) become large, hence transmission characteristics such as error rate are greatly influenced by this. That is, the OFDM system has such problems that each carrier becomes narrow-band and so it is easily influenced by fading, even though it has such features that the influence of multipath delay can be ignored because its symbol length is long, and an equalizer is not needed.

This point is explained with reference to FIG. 3. FIG. 3 shows which bit of energy is contained in each carrier, in the case where BPSK is used as the modulation system. As shown in FIG. 3, only one bit of energy is contained in each carrier. Therefore, when energy of a certain carrier has been attenuated because of frequency selective fading, the error rate of a bit which is sent through the vary carrier become remarkably large, and the error rate of the whole frequency band is largely influenced too.

In the case of the OFDM system, the data rate is determined by the number of carriers, therefore, if it is desired to change the data rate, changing of the number of carriers is needed. At this time, the transmission bandwidth varies due to changing of the number of carriers, hence the performance will be deteriorated unless the bandwidth of the filter which is utilized for the transmitting apparatus and the receiving apparatus is changed. Thus, in the OFDM system, there is a problem that it can not easily cope with a modification of the data rate.

SUMMARY OF THE INVENTION

In view of the foregoing, an object of the present invention is to provide a communication system which is able to alleviate the performance deterioration due to frequency selective fading, retaining the advantages of the OFDM system, and also be able to easily cope with a modification of the data rate.

The foregoing object and other objects of the present invention have been achieved by the provision of the transmitting apparatus that transmits an orthogonal frequency multiplex signal which is composed in such a way that the energy of each bit of the inputted information bit string is diffused throughout the frequency band of the orthogonal carriers, and the energy of the plural bits is multiplexed toward each orthogonal carrier.

Because the energy of each bit of the inputted information bit string is diffused throughout the frequency band of the orthogonal carriers, and the energy of the plural bits is multiplexed toward each orthogonal carrier, even though the energy of the partial orthogonal carrier is lost owing to frequency selective fading, attenuation value of the energy of each bit is little, and so it is able to alleviate remarkable degrading of the error rate.

Besides, in this case, since the plural bits are multiplexed with respect to each orthogonal carrier, the data rate can be easily changed without a conventional modification of the frequency band of the filter and so on, by changing the number of code-multiplexing.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of the present invention will be described with reference to the accompanying drawings:

(1) The First Embodiment

Figure 4:
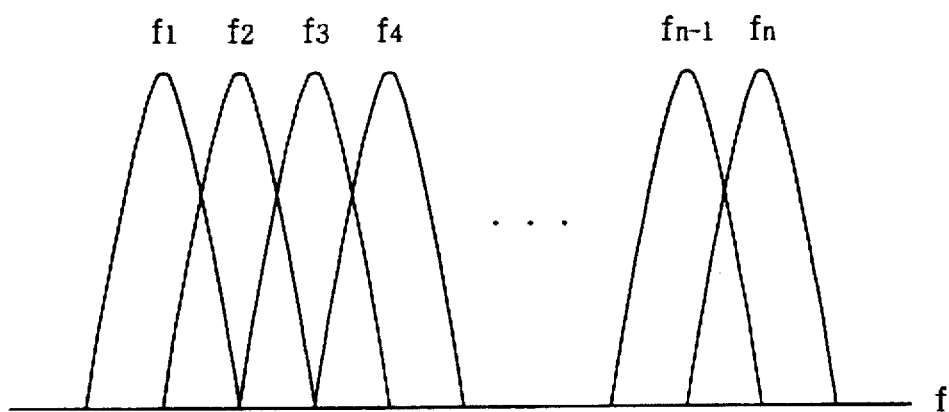
FIG. 4 is a schematic diagram showing the orthogonal carriers used in the OFDM system.

In the OFDM system, transmission is performed using plural orthogonal carriers which are mutually orthogonal, as shown in FIG. 4. In the case of this embodiment, electric power of information of one bit is diffused to every one of the orthogonal carriers (this is referred to as spectrum diffusion herein), and an approach which is called code-multiplexing is used, so that improvement of the frequency utilization factor is realized.

That is, in the transmitting apparatus, an information data (an information bit string) is converted into orthogonal phase signals by a modulator, and then converted into parallel data strings by a serial-parallel converter, and multiplied by the diffusion codes which are exclusive to the respective data strings. Then, the respective parallel data strings which have been multiplied by the diffusion codes are added, and this is sequentially allocated to the respective orthogonal carriers, and then subjected to inverse Fourier transformation, so that a code-multiplexed signal of which information data has been diffused throughout the frequency band is produced.

On the other hand, in the receiving apparatus, the orthogonal phase components in the respective orthogonal carriers are extracted by Fourier transformation, and then the extracted orthogonal phase components are converted into serial signal strings by means of a parallel-serial converter, and this is separated in accordance with the number of the code channels, and multiplied by the diffusion codes which are exclusive to the respective code channels. Then, the parallel signal strings which have been multiplied by the diffusion codes are integrated to the amounts which correspond to the diffusion-code lengths respectively, so that the information data is recovered on the basis of those which have been integrated.

In this connection, the products of the multiplications of the first diffusion code which is common to the respective code channels and exclusive to each system by the second diffusion codes which are exclusive to the respective code channels are used, as the diffusion codes.

Figure 5:
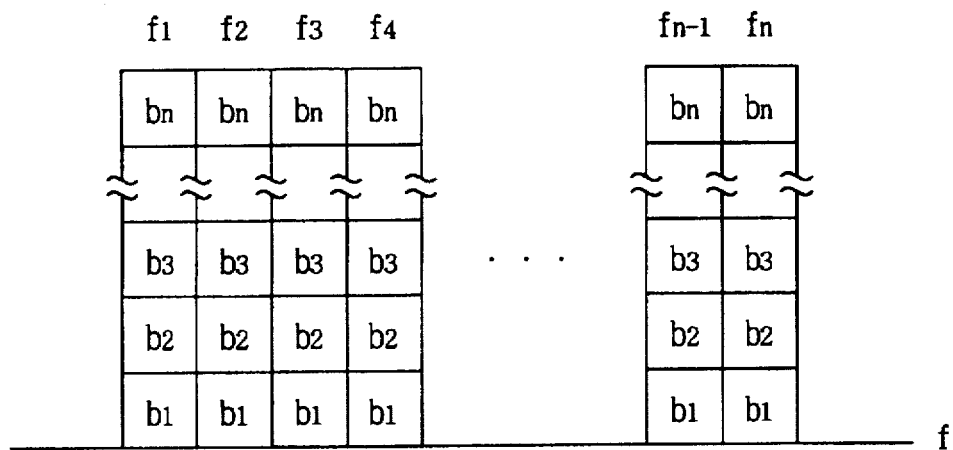
FIG. 5 is a schematic diagram showing the situation of the energy distribution of each bit according to the present invention.

By such an approach, the information of one bit is diffused to all orthogonal carriers (that is, all orthogonal frequencies), and degrading of the error rate which is due to frequency selective fading can be alleviated hereby. That is, as shown in FIG. 5, energy of each bit ($b_1$–$b_n$) is diffused to all carriers ($f_1$–$f_n$) and then transmitted. As to a particular carrier, various bits are code-multiplexed and stacked up. Therefore, even though the energy of partial carriers is lost owing to frequency selective fading, the attenuation value of energy of each bit is little, and so it is able to prevent remarkable degrading of the error rate.

Because the products of the multiplications of the first diffusion code which is common to the respective code channels and exclusive to each system by the second diffusion codes which are exclusive to the respective code channels are used as the diffusion codes, it is able to reduce the interference between systems and the interference between code channels.

Additionally, plural bits are multiplexed on the same frequency using code-multiplexing, therefore it is able to easily change the data rate without a modification of the bandwidth of the filter, by changing the number of code-multiplexing.

Figure 1:
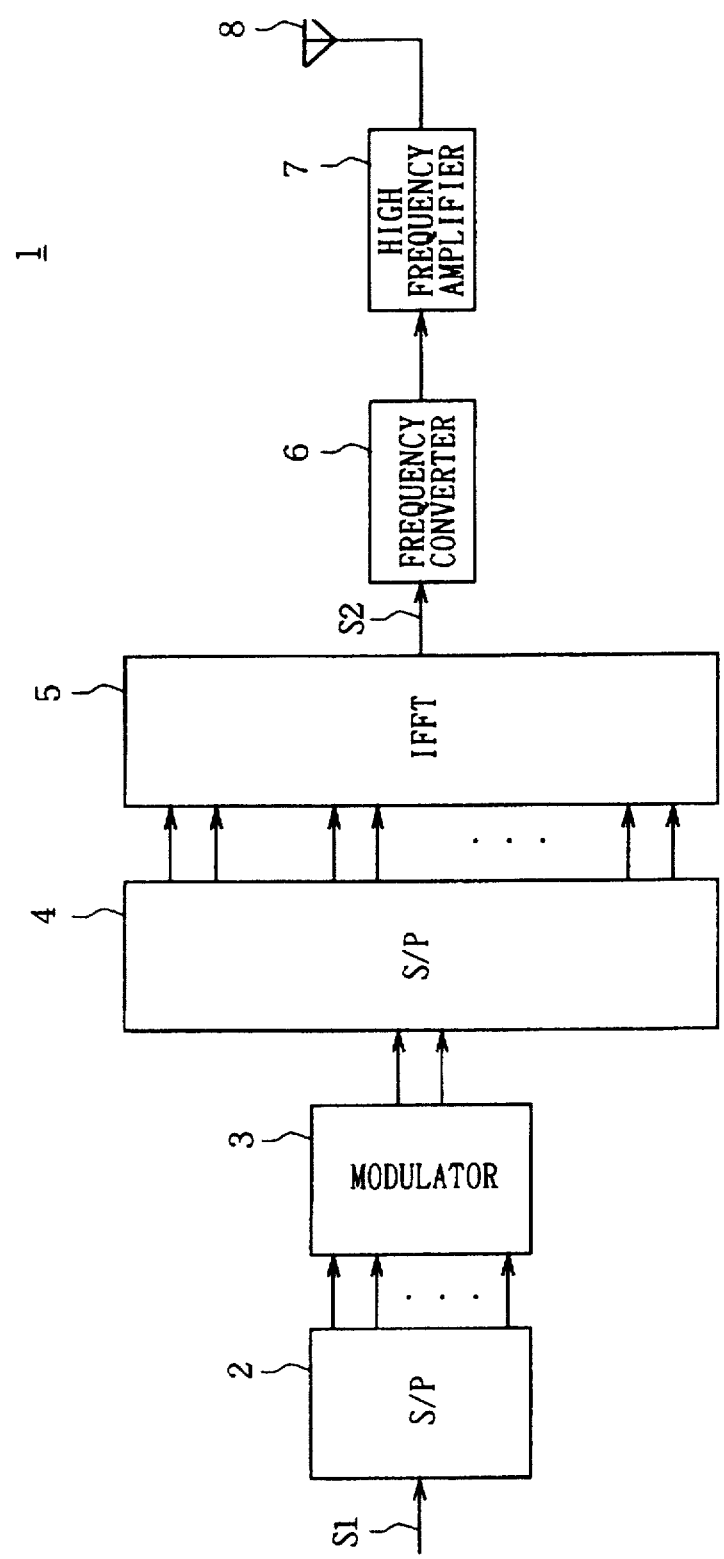
FIG. 1 is a block diagram showing the configuration of the conventional transmitting apparatus.
Figure 6:
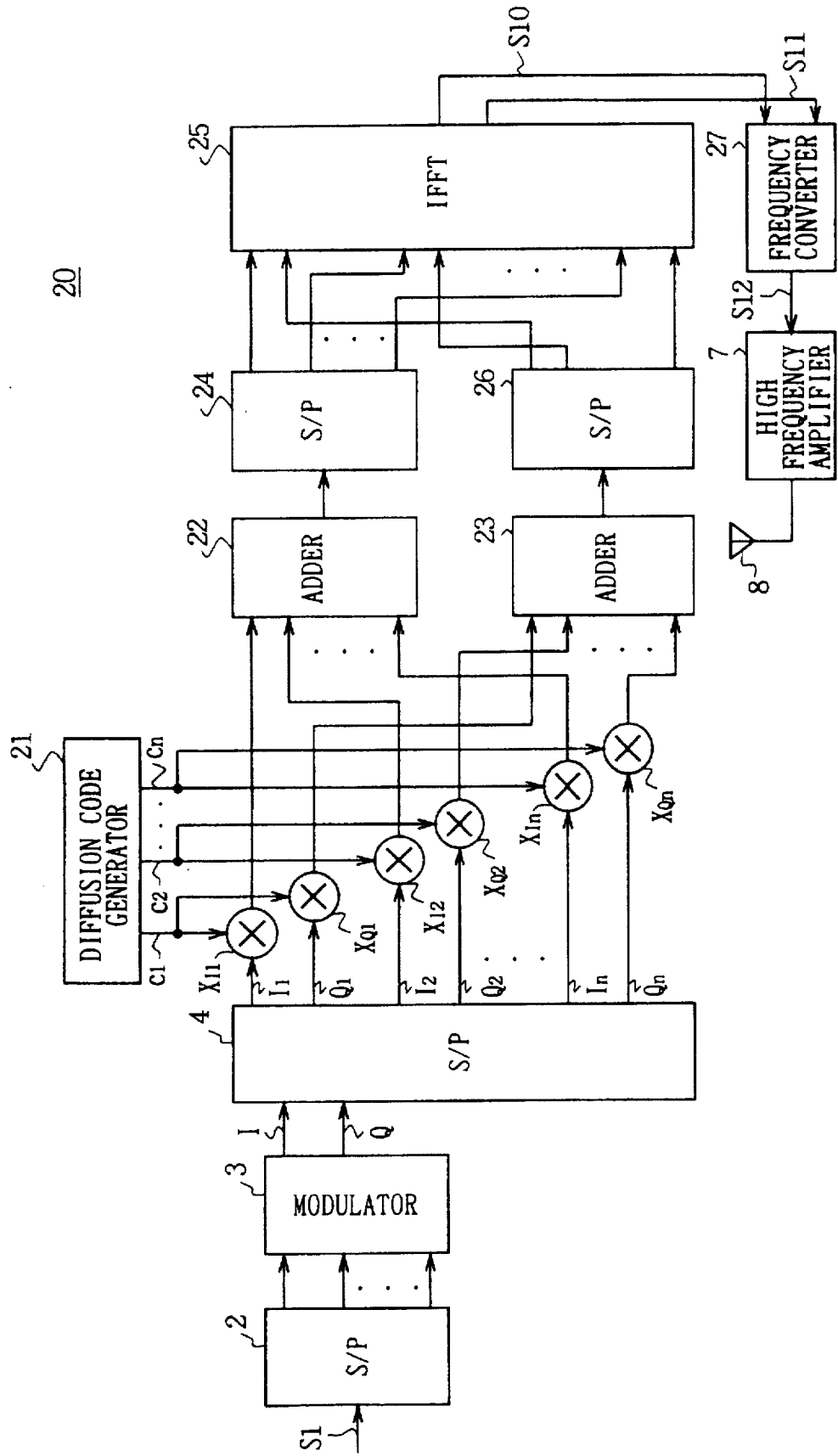
FIG. 6 is a block diagram showing the configuration of the transmitting apparatus according to the first embodiment.

In FIG. 6, which has the same reference numerals as FIG. 1 on the portions corresponding to those of FIG. 1, an instantiated configuration of the transmitting apparatus according to the embodiment is shown. As shown in FIG. 6, in the transmitting apparatus 20, the information data (the information bit string) S1 is inputted to a serial-parallel converter (S/P) 2, and then, in this place, the information data S1 are converted into parallel data strings in accordance with the modulation multivalued number. However, if the information data S1 is originally parallel data strings in accordance with the modulation system, then conversion-to-parallel is not needed.

In this connection, if the modulation system is binary phase shift keying (BPSK) then the modulation multivalued number becomes "1", and if it is quadrature phase shift keying (QPSK) then the modulation multivalued number becomes "2", and if it is 8-phase phase shift keying (8-phase PSK) then the modulation multivalued number becomes "3", and if it is quadrature amplitude modulation (16 QAM) then the modulation multivalued number becomes "4".

A modulator 3 produces orthogonal phase signals (I, Q) which are corresponding to the stated modulation system, on the basis of the inputted parallel data strings. As an example, in the case where the modulation system is QPSK, 4-phase information is produced from 2-bit information. When the produced orthogonal phase signals are represented in the form of [I-component, Q-component], then it becomes any one of [1, 1], [−1, 1], [−1, −1], and [1, −1].

The orthogonal phase signals (I, Q) which have been produced by the modulator 3 are inputted to a serial-parallel converter (S/P) 4 respectively, and then, at this place, converted into parallel data strings ($I_1$ and $Q_1$–$I_n$ and $Q_n$) in accordance with the number of code-multiplexing (that is, the number of code channels). In this connection, as used herein, conversion to parallel data strings refers to performing serial-to-parallel conversion with respect to each of the orthogonal phase signals. That is, the I-component and the Q-component are respectively subjected to serial-to-parallel conversion, in accordance with the number of code channels.

Hereupon, a diffusion code generator 21 generates diffusion codes ($c_1$–$c_n$) which are exclusive to the respective code channels. The diffusion codes ($c_1$–$c_n$) are supplied to multipliers ($X_{I1}$, and $X_{Q1}$–$X_{In}$ and $X_{Qn}$) respectively, and then, in this place, multiplied by the orthogonal phase signals ($I_1$ and $Q_1$–$I_n$ and $Q_n$) at every code channel. In other words, the multiplier $X_{I1}$ multiplies the in-phase component $I_1$ by the diffusion code $c_1$, and the multiplier $X_{Q1}$ multiplies the orthogonal component $Q_1$ by the diffusion code $c_1$. The multiplier $X_{I2}$ multiplies the in-phase component $I_2$ by the diffusion code $c_2$, and the multiplier $X_{Q2}$ multiplies the orthogonal component $Q_2$ by the diffusion code $c_2$. The multiplier $X_{In}$ multiplies the in-phase component $I_n$ by the diffusion code $c_n$, and the multiplier $X_{Qn}$ multiplies the orthogonal component $Q_n$ by the diffusion code $c_n$. Thus, in a particular code channel, the respective components are multiplied by the same diffusion code.

The outputs of the multipliers ($X_{I1}$ and $X_{Q1}$–$X_{In}$ and $X_{Qn}$) are inputted to adders 22, 23 in accordance with the distinction of orthogonal phases, and added, respectively. That is, in the adder 22, the outputs of the multipliers $X_{I1}$–$X_{In}$ which are the I-components of the respective code channels are added; and in the adder 23, the outputs of the multipliers $X_{Q1}$–$X_{Qn}$ which are the Q-components of the respective code channels are added.

The output of the adder 22 is inputted to a serial-parallel converter (S/P) 24, and, in this place, converted into parallel data strings in accordance with the number of orthogonal carriers, and then supplied to an inverse Fourier transformer (IFFT) 25 as the I-components of the respective orthogonal carriers of OFDM.

On the other hand, the output of the adder 23 is inputted to a serial-parallel converter (S/P) 26, and, in this place, converted into parallel data strings in accordance with the number of orthogonal carriers, and then supplied to the inverse Fourier transformer 25 as the Q-components of the respective orthogonal carriers of OFDM.

The inverse Fourier transformer 25 produces orthogonal frequency multiplex signals S10, S11 from the supplied phase information of the respective orthogonal carriers (that is, the orthogonal phase components which are comprised of the I-components and the Q-components), and outputs the orthogonal frequency multiplex signals S10, S11 to a frequency converter 27. The frequency converter 27 converts the inputted orthogonal frequency multiplex signals S10, S11 into a signal of the desired carrier frequency band, and outputs it as the transmission signal S12. The transmission signal S12 is inputted to a high-frequency amplifier 7, and amplified to the stated electric power, in this place, and then radiated on the air through an antenna 8.

Figure 2:
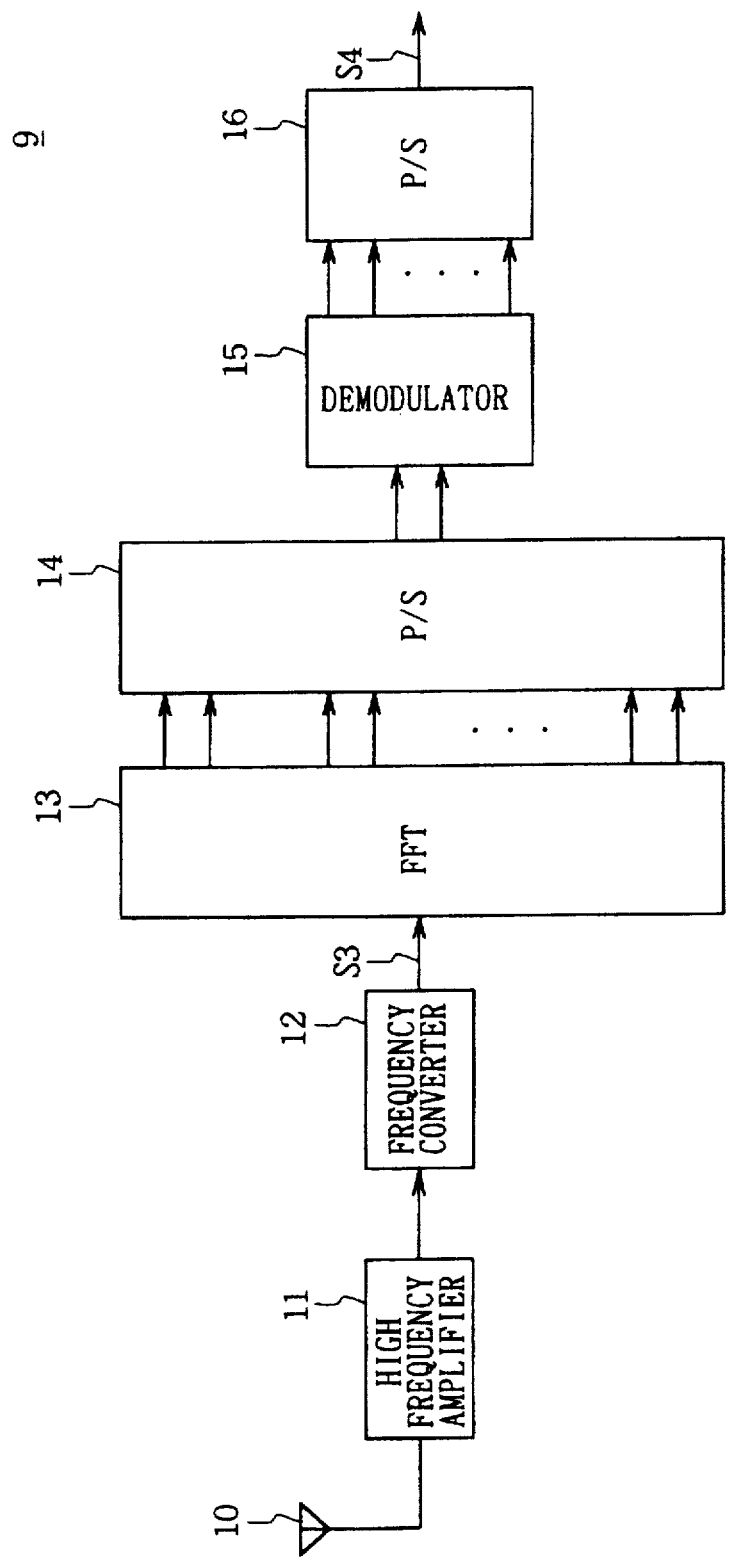
FIG. 2 is a block diagram showing the configuration of the conventional receiving apparatus.
Figure 7:
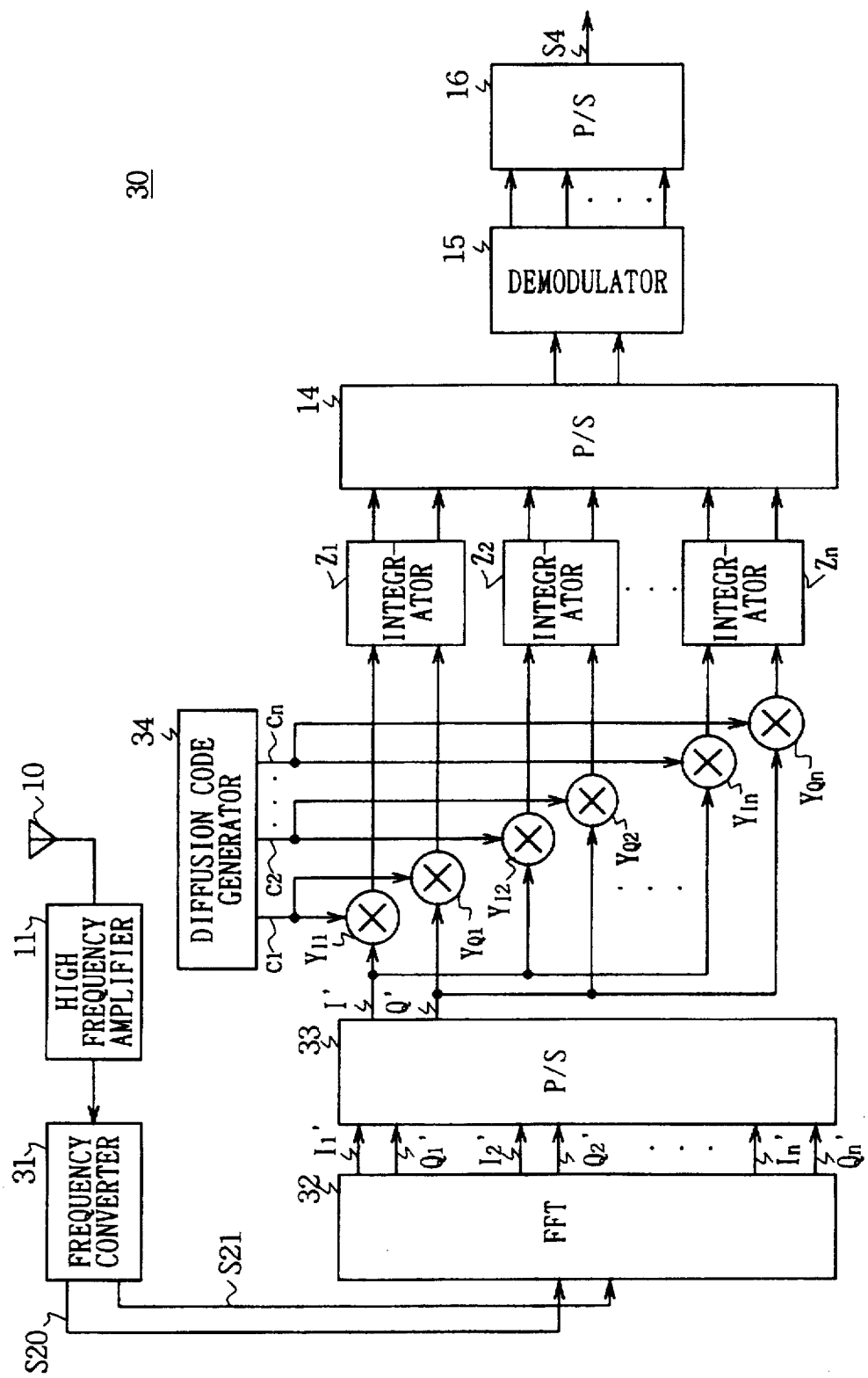
FIG. 7 is a block diagram showing the configuration of the receiving apparatus according to the first embodiment.

On the other hand, in FIG. 7, which has the same reference numerals as FIG. 2 on the portions corresponding to those of FIG. 2, a configuration is shown of a receiving apparatus according to the embodiment. As shown in FIG. 7, in the receiving apparatus 30, the received signal which has been received with an antenna 10 is amplified to the stated electric power by a high-frequency amplifier 11, converted into base band signals S20, S21 by means of a frequency converter 31, and then inputted to a Fourier transformer (FFT) 32. In this connection, the base band signals S20, S21 are those which correspond to the orthogonal frequency multiplex signals S10, S11 in the transmitting apparatus 20.

The Fourier transformer 32 extracts the orthogonal phase components in the respective orthogonal carriers ($I_1'$ and $Q_1'$–$I_n'$ and $Q_n'$) from the inputted base band signals S20, S21, and outputs the components to a parallel-serial converter (P/S) 33. The parallel-serial converter 33 converts the inputted orthogonal phase components ($I_1'$ and $Q_1'$–$I_n'$ and $Q_n'$) into serial signal strings. That is, the parallel-serial converter 33 performs serial conversion of the orthogonal phase components ($I_1'$ and $Q_1'$–$I_n'$ and $Q_n'$) individually, with respect to each component, and then outputs the orthogonal phase components $I'$, $Q'$.

The orthogonal phase components $I'$, $Q'$ are separated in accordance with the number of the code channels, and supplied to multipliers ($Y_{I1}$ and $Y_{Q1}$–$Y_{In}$ and $Y_{Qn}$).

A diffusion code generator 34, which is corresponding to the diffusion code generator 21 of the transmission side, generates diffusion codes ($c_1$–$c_n$) which are exclusive to the respective code channels. The diffusion codes ($c_1$–$c_n$) are supplied to the multipliers ($Y_{I1}$ and $Y_{Q1}$–$Y_{In}$ and $Y_{Qn}$) respectively, and multiplied by the orthogonal phase components $I'$, $Q'$. That is, the multiplier $Y_{I1}$ multiplies the in-phase component $I'$ by the diffusion code $c_1$, and the multiplier $Y_{Q1}$ multiplies the orthogonal component $Q'$ by the diffusion code $c_1$. The multiplier $Y_{I2}$ multiplies the in-phase component $I'$ by the diffusion code $c_2$, and the multiplier $Y_{Q2}$ multiplies the orthogonal component $Q'$ by the diffusion code $c_2$. The multiplier $Y_{In}$ multiplies the in-phase component $I'$ by the diffusion code $c_n$, and the multiplier $Y_{Qn}$ multiplies the orthogonal component $Q'$ by the diffusion code $c_n$. Thus, the orthogonal phase components $I'$, $Q'$ are multiplied by the diffusion codes which are exclusive to the respective code channels.

The outputs of the multipliers ($Y_{I1}$ and $Y_{Q1}$–$Y_{In}$ and $Y_{Qn}$) are respectively inputted to integrators $Z_1$–$Z_n$ in accordance with the distinction of code channels, and then, integrated to the amounts which correspond to the diffusion-code lengths, in accordance with the distinction of code channels. In this case, the respective integrators $Z_1$–$Z_n$, which have the configuration of 2-inputs and 2-outputs, integrate that which have been inputted, and then output them, independently.

The results of integration of the respective code channels, which are outputted from the integrators $Z_1$–$Z_n$, are inputted to a parallel-serial converter (P/S) 14 respectively, and then, converted into a serial signal string with respect to each component. In other words, in the parallel-serial converter 14, the fellow I-components out of the results of integration are converted into one serial signal string, and the fellow Q-components out of the results of integration are converted into one serial signal string, so that the serial signal strings which are comprised of the orthogonal two components are outputted.

This serial signal strings, which are comprised of the two orthogonal components, are inputted to a demodulator 15, and demodulated at this place. At this point, parallel data strings of plural bits (for instance, if it is BPSK then 1 bit, if QPSK then 2 bits, if 8-phase PSK then 3 bits, if 16 QAM then 4 bits) are outputted from the demodulator 15 in accordance with the modulation multivalued number (that is, information symbols are outputted). So, by converting them into serial data strings with a parallel-serial converter (P/S) 16, the information data S4 can be obtained which corresponds to the information data S1 of the transmitting side.

In the case where the modulation system is BPSK, the output of the demodulator 15 is serial data strings, so there is no need of parallel-to-serial conversion, and the parallel-serial converter 16 is not required.

Figure 8:
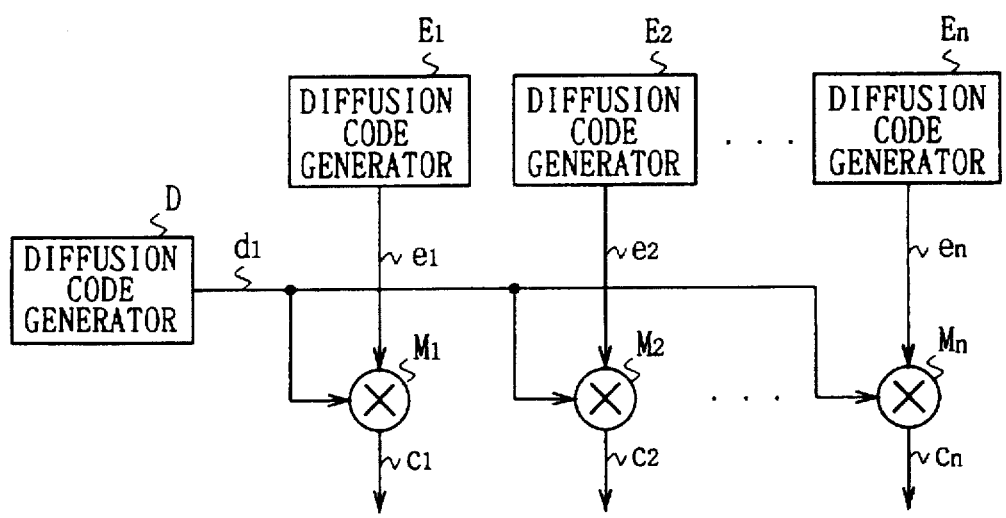
FIG. 8 is a block diagram showing the configuration of the diffusion-code generator.

The diffusion code generators 21 and 34 are now explained, referring to FIG. 8. However, because the configurations of the diffusion code generators 21 and 34 are the same, only the diffusion code generator 21 is explained here.

As shown in FIG. 8, the diffusion code generator 21 is composed of a diffusion code generator D for generating the first diffusion code $d_1$ which is exclusive to the individual system, diffusion code generators $E_1-E_n$ for generating the second diffusion codes $e_1-e_n$ which are exclusive to the respective code channels, and multipliers $M_1-M_n$.

The first diffusion code $d_1$ which has been produced by the diffusion code generator D is inputted to multipliers $M_1-M_n$. The second diffusion codes $e_1-e_n$ which have been produced by the diffusion code generators $E_1-E_n$ are inputted to the corresponding multipliers $M_1-M_n$, respectively. The multiplier $M_1$ multiplies the inputted first diffusion code $d_1$ by the second diffusion code $e_1$, and the multiplier $M_2$ multiplies the inputted first diffusion code $d_1$ by the second diffusion code $e_2$. Likewise, the multiplier $M_n$ multiplies the inputted first diffusion code $d_1$ by the second diffusion code $e_n$. As a result, the diffusion codes $c_1-c_n$ which are corresponding to the respective code channels are outputted from the multipliers $M_1-M_n$.

In this case, the first diffusion code $d_1$ contributes to the effect of alleviating a disturbance toward the other system, and the second diffusion codes $e_1-e_n$ contributes to the effect of alleviating an interference among the multiplexed code channels. The pseudo noise code (the PN code) which is represented by the maximum length linear shift register sequence code (the M series code) is used as the first diffusion code $d_1$, and the PN code which is represented by the M series code or the orthogonal code which is represented by the Walsh code is used as the second diffusion codes $e_1-e_n$. In this connection, in the case where the orthogonal code is used as the second diffusion code, the interference among the code channels can be substantially alleviated, as is known from the feature of the orthogonal code.

With the above configuration, in the transmitting apparatus 20, the orthogonal phase signals (I, Q) which are obtained from the information data S1 are converted into the parallel data strings ($I_1$ and $Q_1-I_n$ and $Q_n$) which are corresponding to the number of the code channels, and the respective parallel data strings ($I_1$ and $Q_1-I_n$ and $Q_n$) are multiplied by the diffusion codes ($c_1-c_n$) which are exclusive to the respective code channels. Then, the respective parallel data strings which have been multiplied by the diffusion codes are added in accordance with the distinction of orthogonal phases, and this is converted into parallel data strings which are corresponding to the number of the orthogonal carriers, and subjected to inverse Fourier transformation. As a result, in the transmitting apparatus 20, transmission is performed in such a manner that each bit of the information data S1 is diffused throughout the frequency band $(f_1-f_n)$ as shown in FIG. 5, and plural bits are code-multiplexed with respect to the respective orthogonal carriers $(f_1-f_n)$.

On the other hand, in the receiving apparatus 30, the orthogonal phase components ($I_1'$ and $Q_1'-I_n'$ and $Q_n'$) in the respective orthogonal carriers are extracted from the received base band signal S20, S21 by Fourier transformation, and then the extracted orthogonal phase components ($I_1'$ and $Q_1'-I_n'$ and $Q_n'$) are accumulated in accordance with time series and converted into the serial signal strings (I', Q'), and this is separated in accordance with the number of the code channels, and multiplied by the diffusion codes ($c_1-c_n$) which are exclusive to the respective code channels (in other words, inverse diffusion is performed). Then, the parallel signal strings which have been multiplied by the diffusion codes are respectively integrated to the amounts which correspond to the diffusion-code lengths, and the information data is recovered on the basis of those which have been integrated. As a result, in the receiving apparatus 30, the information data is recovered which had been diffused over the whole frequency band $(f_1-f_n)$ and code-multiplexed with respect to the respective orthogonal carriers.

In this way, in the case of this embodiment, each bit of the information data is diffused to all orthogonal carriers as shown in FIG. 5 and then transmitted, as a result, even though the energy of a part of the carriers is lost owing to frequency selective fading, attenuation value of the energy of each bit is little, and so it is able to alleviate remarkable degrading of the error rate.

Figure 3:
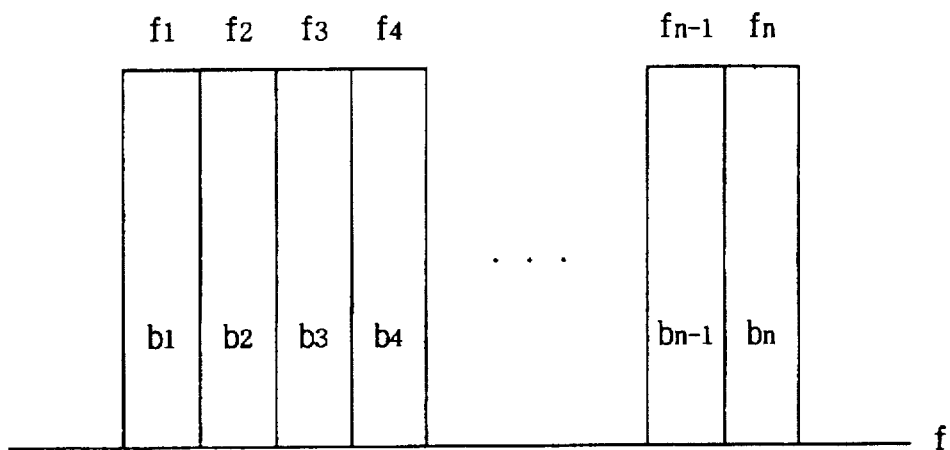
FIG. 3 is a schematic diagram showing the situation of the conventional energy distribution of each bit.

In this connection, in the case of the conventional system, each bit of the information data has not been diffused over the whole frequency band, but the energy of one bit has been placed on only one carrier, as shown in FIG. 3; therefore, if energy of a certain carrier has been lost because of frequency selective fading, an error has been produced in the bit which is transmitted through the faded carrier, so that the error rate has been degraded as a whole.

In the case of this embodiment, the codes ($c_1-c_n$) which are the products of the first diffusion code ($d_1$) which is common to the respective code channels and exclusive to each system and the second diffusion codes ($e_1-e_n$) which are exclusive to the respective code channels are used, as the diffusion codes which are utilized for code multiplexing; as a result, interference among the different systems can be avoided by virtue of the first diffusion code, and interference among the code channels can be avoided by virtue of the second diffusion codes.

Besides, in the case of this embodiment, plural bits are multiplexed toward the same carrier by code multiplexing, and the data rate is therefore easily changed without any conventional modification of a filter bandwidth etc., by changing the number of code-multiplexing (that is, the number of the code channels).

According to the above configuration, each bit of the information data has been diffused to every orthogonal carriers, and the plural bits have been code-multiplexed with respect to each orthogonal carrier, as a result, even though the case where frequency selective fading has occurred remarkable degrading of the error rate can be alleviated, and also in the case where the data rate is changed, the change can be easily accommodated. In this way, a communication system can be realized which is able to alleviate the performance deterioration due to frequency selective fading, and to easily cope with a modification of the data rate, retaining the advantages of the OFDM system.

(2) The Second Embodiment

Figure 9:
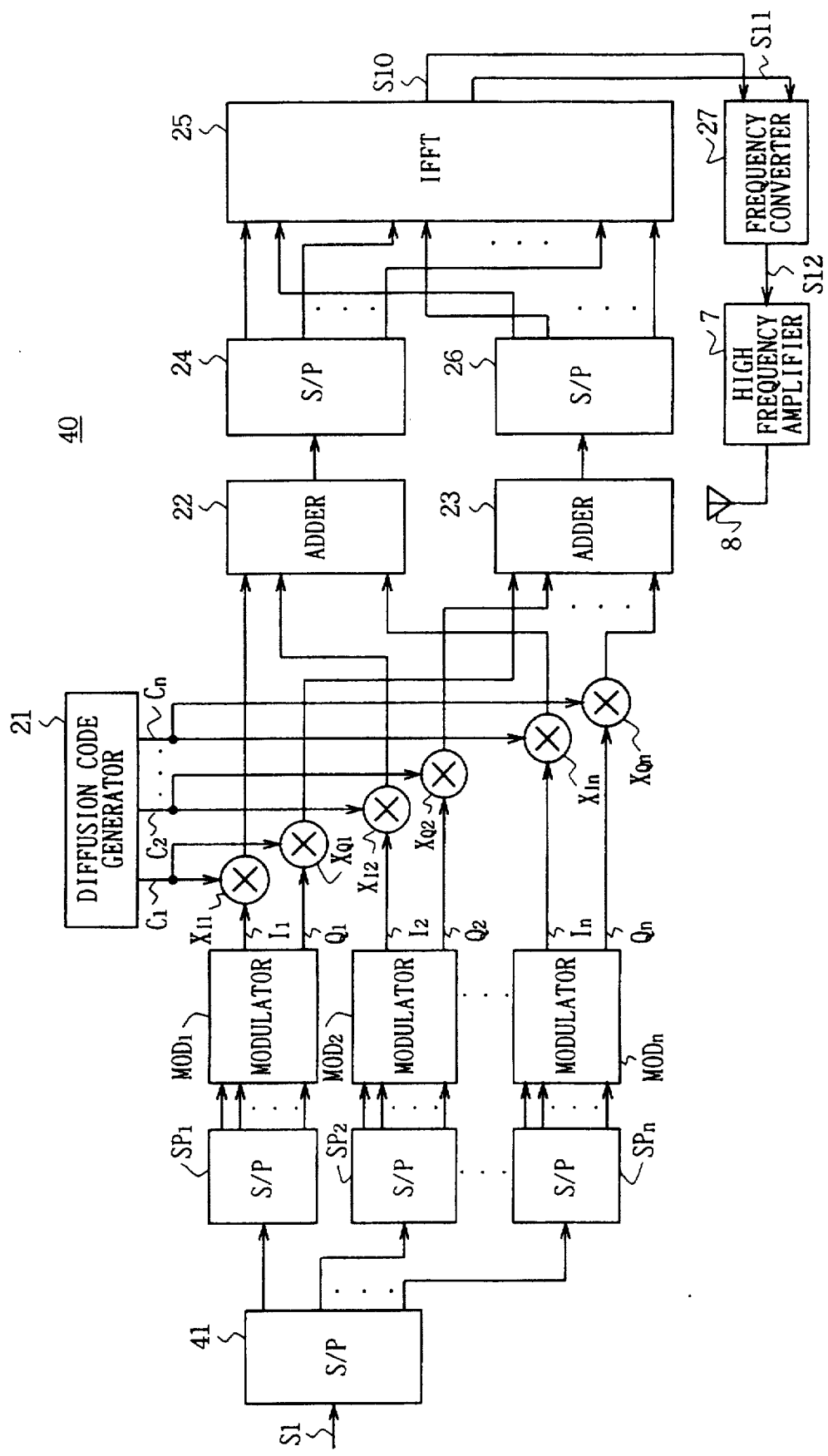
FIG. 9 is a block diagram showing the configuration of the transmitting apparatus according to the second embodiment.

In FIG. 9, which has the same reference numerals as FIG. 6 on the portions corresponding to those of FIG. 6, the reference numeral 40 designates a transmitting apparatus of the second embodiment as a whole. In this transmitting apparatus 40, an information data S1 is inputted to a serial-parallel converter (S/P) 41, and then the information data S1 is converted into parallel data strings, in accordance with the number of code-multiplexing (that is, the number of the code channels). This parallel data strings are inputted to serial-parallel converters (S/P) $SP_1$-$SP_n$ respectively, and then, at this places, converted into parallel data strings respectively, in accordance with the modulation multivalued number (if BPSK then "1", if QPSK then "2", if 8-phase PSK then "3", if 16QAM then "4").

Modulators $MOD_1$-$MOD_n$ respectively produce orthogonal phase signals ($I_1$ and $Q_1$-$I_n$ and $Q_n$) which are corresponding to the stated modulation system, on the basis of the inputted parallel data strings. As an example, in the case where the modulation system is QPSK, 4-phase information is produced from 2-bit information. If the produced orthogonal phase signal is represented in the form of [I-component, Q-component], then it becomes any one of [1, 1], [−1, 1], [−1, −1], and [1, −1]. The orthogonal phase signals ($I_1$ and $Q_1$-$I_n$ and $Q_n$) which are outputted from the modulators $MOD_1$-$MOD_n$ are inputted to multipliers ($X_{I1}$ and $X_{Q1}$-$X_{In}$ and $X_{Qn}$), respectively.

A diffusion code generator 21, which has the configuration shown in FIG. 8 like the first embodiment, generates diffusion codes ($c_1$-$c_n$) which have been differentiated from each other and assigned to the respective code channels. The diffusion codes ($c_1$-$c_n$) are supplied to the multipliers ($X_{I1}$ and $X_{Q1}$-$X_{In}$ and $X_{Qn}$) respectively, and the orthogonal phase signals ($I_1$ and $Q_1$-$I_n$ and $Q_n$) are multiplied, by the diffusion codes at respective code channels. In other words, the multiplier $X_{I1}$ multiplies the in-phase component $I_1$ by the diffusion code $c_1$, and the multiplier $X_{Q1}$ multiplies the orthogonal component $Q_1$ by the diffusion code $c_1$. The multiplier $X_{I2}$ multiplies the in-phase component $I_2$ by the diffusion code $c_2$, and the multiplier $X_{Q2}$ multiplies the orthogonal component $Q_2$ by the diffusion code $c_2$. The multiplier $X_{In}$ multiplies the in-phase component $I_n$ by the diffusion code $c_n$, and the multiplier $X_{Qn}$ multiplies the orthogonal component $Q_n$ by the diffusion code $c_n$. Thus, in a particular code channel, the respective components are multiplied by the same diffusion code.

The outputs of the multipliers ($X_{I1}$ and $X_{Q1}$-$X_{In}$ and $X_{Qn}$) are inputted to adders 22, 23 respectively in accordance with the distinction of orthogonal phases, and added. In other words, in the adder 22, the outputs of the multipliers $X_{I1}$-$X_{In}$, which are the I-components of the respective code channels, are added; and in the adder 23, the outputs of the multipliers $X_{Q1}$-$X_{Qn}$, which are the Q-components of the respective code channels, are added.

The output of the adder 22 is inputted to a serial-parallel converter (S/P) 24, and converted, into parallel data strings in accordance with the number of the orthogonal carriers, and then supplied to an inverse Fourier transformer (IFFT) 25 as the I-components of the respective orthogonal carriers of OFDM.

On the other hand, the output of the adder 23 is inputted to a serial-parallel converter (S/P) 26, and converted, in this place, into parallel data strings in accordance with the number of orthogonal carriers, and then supplied to the inverse Fourier transformer 25 as the Q-components of the respective orthogonal carriers of OFDM.

The inverse Fourier transformer 25 produces orthogonal frequency multiplex signals S10, S11 from the supplied phase information of the respective orthogonal carriers (that is, the orthogonal phase components which are composed of the I-components and the Q-components), and outputs the orthogonal frequency multiplex signals S10, S11 to a frequency converter 27. The frequency converter 27 converts the inputted orthogonal frequency multiplex signals S10, S11 into a signal of the desired carrier frequency band, and outputs it as a transmission signal S12. The transmission signal S12 is inputted to a high-frequency amplifier 7, amplified to the stated electric power in this place, and then radiated on the air through an antenna 8.

Figure 10:
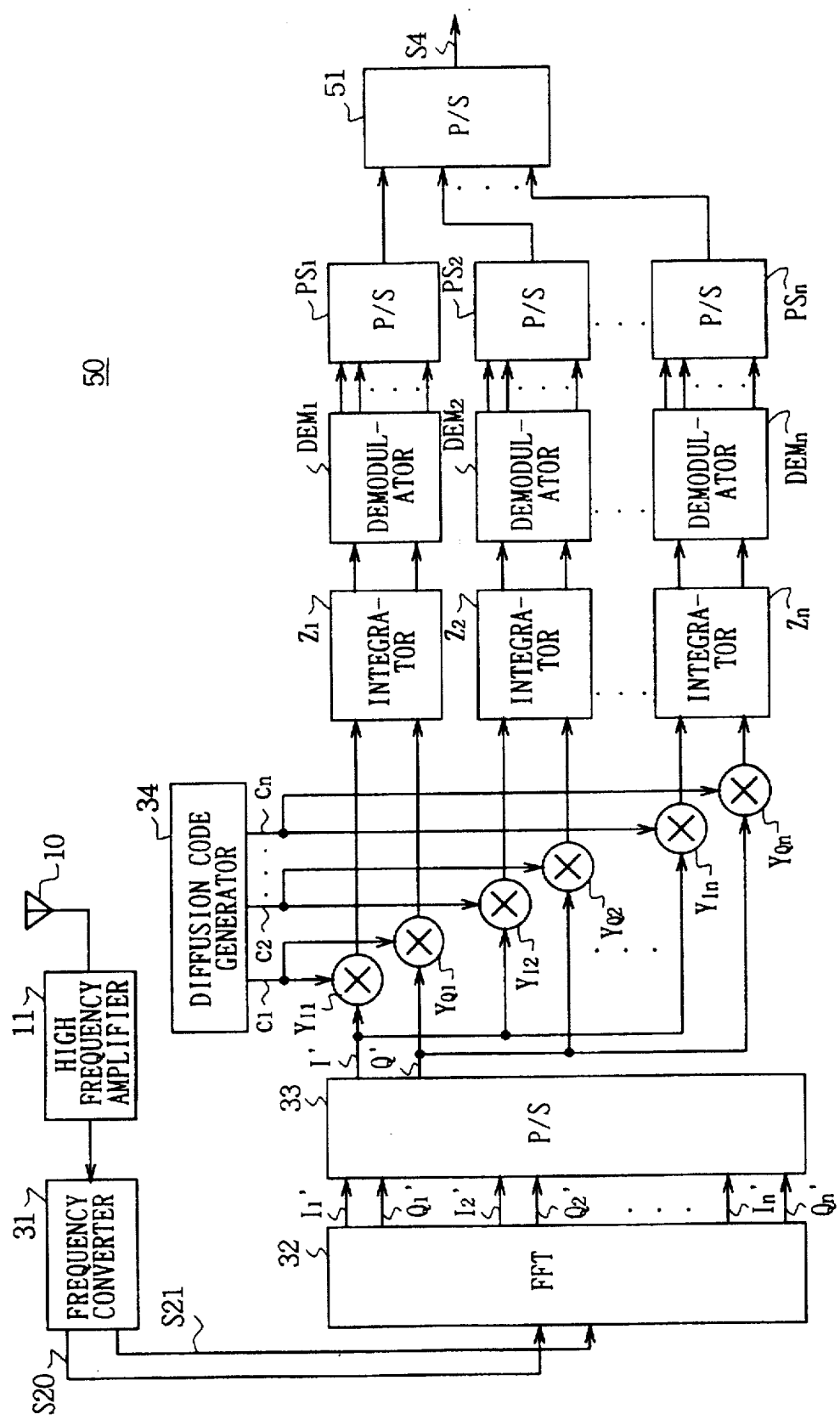
FIG. 10 is a block diagram showing the configuration of the receiving apparatus according to the second embodiment.

On the other hand, in FIG. 10, which has the same reference numerals as FIG. 7 on the portions corresponding to those of FIG. 7, a receiving apparatus of the second embodiment is shown. As shown in FIG. 10, in the receiving apparatus 50, the received signal which has been received with an antenna 10 is amplified to the stated electric power by a high-frequency amplifier 11, converted into base band signals S20, S21 by means of a frequency converter 31, and then inputted to a Fourier transformer (FFT) 32. In this connection, the base band signals S20, S21 correspond to the orthogonal frequency multiplex signals S10, S11 in the transmitting apparatus 40.

The Fourier transformer 32 extracts orthogonal phase components in the respective orthogonal carriers ($I_1'$ and $Q_1'$-$I_n'$ and $Q_n'$) from the inputted base band signals S20, S21, and outputs the components to a parallel-serial converter (P/S) 33. The parallel-serial converter 33 converts the inputted orthogonal phase components ($I_1'$ and $Q_1'$-$I_n'$ and $Q_n'$) into serial signal strings. That is, in the parallel-serial converter 33, conversion-to-serial of the orthogonal phase components ($I_1'$ and $Q_1'$-$I_n'$ and $Q_n'$) is performed with respect to the respective components, and then the orthogonal phase components I', Q' are outputted.

The orthogonal phase components I', Q' are separated in accordance with the number of the code channels, and supplied to multipliers ($Y_{I1}$ and $Y_{Q1}$-$Y_{In}$ and $Y_{Qn}$).

A diffusion code generator 34, which corresponds to the diffusion code generator 21 of the transmission side and has the configuration shown in FIG. 8 like the first embodiment, generates diffusion codes ($c_1$-$c_n$) which have been differentiated from each other and assigned to the respective code channels. The diffusion codes ($c_1$-$c_n$) are supplied to the multipliers ($Y_{I1}$ and $Y_{Q1}$-$Y_{In}$ and $Y_{Qn}$) respectively, and the orthogonal phase components I', Q' are multiplied by these diffusion codes respectively. That is, the multiplier $Y_{I1}$ multiplies the in-phase component I' by the diffusion code $c_1$, and the multiplier $Y_{Q1}$ multiplies the orthogonal component Q' by the diffusion code $c_1$. The multiplier $Y_{I2}$ multiplies the in-phase component I' by the diffusion code $c_2$, and the multiplier $Y_{Q2}$ multiplies the orthogonal component Q' by the diffusion code $c_2$. Besides, the multiplier $Y_{In}$ multiplies the in-phase component I' by the diffusion code $c_n$, and the multiplier $Y_{Qn}$ multiplies the orthogonal component Q' by the diffusion code $c_n$. Thus, the orthogonal phase components I', Q' are multiplied by the diffusion codes which are exclusive to the respective code channels.

The outputs of the multipliers ($Y_{I1}$ and $Y_{Q1}$-$Y_{In}$ and $Y_{Qn}$) are respectively inputted to integrators $Z_1$-$Z_n$ in accordance with the distinction of code channels, and then, in this place, integrated to the amounts which correspond to the diffusion-code lengths, in accordance with the distinction of code channels. In this case, the respective integrators $Z_1$-$Z_n$, which have the configuration of 2-inputs and 2-outputs, integrate that which have been inputted, and then output them, independently.

The results of integration of the respective code channels, which are outputted from the integrators $Z_1$-$Z_n$, are inputted to demodulators $DEM_1$-$DEM_n$ respectively, and then, in this place, demodulated in accordance with the distinction of code channels. At this point, parallel data strings of plural bits (for instance, if it is BPSK then 1 bit, if QPSK then 2 bits, if 8-phase PSK then 3 bits, if 16 QAM then 4 bits) are outputted from the demodulators $DEM_1$-$DEM_n$ in accordance with the modulation multivalued number (in other words, information symbols are outputted). The results of demodulation of the demodulators $DEM_1-DEM_n$ are respectively inputted to parallel-serial converters (P/S) $PS_1-PS_n$, and converted into serial data strings in accordance with the distinction of the code channels.

The results of demodulation of respective code channels which have been converted into the serial data strings by the parallel-serial converters $PS_1-PS_n$ are inputted to a parallel-serial converter (P/S) 51 respectively, and then converted into a serial data string, in this place. Hereby, the information data S4 which is corresponding to the information data S1 of the transmitting side is obtained.

In this connection, in the case where the modulation system is BPSK, the output of the demodulators $DEM_1-DEM_n$ are serial data strings, so there is no need of parallel-to-serial conversion, and the parallel-serial converters $PS_1-PS_n$ are not required.

With the above configuration, in the transmitting apparatus 40, the information data S1 is converted into the parallel data strings in accordance with the number of the code channels, and then the orthogonal phase signals ($I_1$ and $Q_1-I_n$ and $Q_n$) are produced from the respective parallel data strings. Then, the orthogonal phase signals ($I_1$ and $Q_1-I_n$ and $Q_n$) are multiplied by the diffusion codes ($c_1-c_n$) which are exclusive to the respective code channels, and the respective parallel data strings which have been multiplied by the diffusion codes are added in accordance with the distinction of the orthogonal phases, and this is converted into parallel data strings which are corresponding to the number of the orthogonal carriers, and subjected to inverse Fourier transformation. As a result, in the transmitting apparatus 40, transmission is performed in such a manner that each bit of the information data S1 is diffused over the whole frequency band ($f_1-f_n$) as shown in FIG. 5, and the plural bits are code-multiplexed toward each orthogonal carrier ($f_1-f_n$).

On the other hand, in the receiving apparatus 50, the orthogonal phase components ($I_1'$ and $Q_1'-I_n'$ and $Q_n'$) in the respective orthogonal carriers are extracted from the received base band signals S20, S21 by Fourier transformation, and then the extracted orthogonal phase components ($I_1'$ and $Q_1'-I_n'$ and $Q_n'$) are accumulated in accordance with time series and converted into the serial signal strings (I', Q'), and this is separated in accordance with the number of the code channels, and multiplied by the diffusion codes ($c_1-c_n$) which are exclusive to the respective code channels (in other words, inverse diffusion is performed). Then, the parallel signal strings which have been multiplied by the diffusion codes are respectively integrated to the amounts which correspond to the diffusion-code lengths, demodulated in accordance with the distinction of the code channels on the basis of those which have been integrated, and subjected to parallel-serial conversion ultimately so that the information data is obtained. As a result, in the receiving apparatus 50, the information data is recovered which had been diffused over the whole frequency band ($f_1-f_n$) and code-multiplexed toward the respective orthogonal carriers.

In this way, also in the case of this embodiment, because each bit of the information data is diffused to all orthogonal carriers and then transmitted, even though the energy of a part of the carriers is lost owing to frequency selective fading, attenuation value of the energy of each bit is little, so that it is able to alleviate remarkable degrading of the error rate.

Besides, also in the case of this embodiment, because the plural bits are multiplexed onto the same carrier by code-multiplexing, the data rate can be easily changed without a conventional modification of the frequency band of the filter and so on, by changing the number of code-multiplexing (that is, the number of the code channels).

According to the above configuration, each bit of the information data has been diffused to all orthogonal carriers, and the plural bits have been code-multiplexed toward each orthogonal carrier, as a result, even though frequency selective fading has occurred remarkable degrading of the error rate can be alleviated, and changing of the data rate can be easily accommodated. In this way, a communication system can be realized which is able to alleviate the performance deterioration due to frequency selective fading, and to easily cope with a modification of the data rate, retaining the advantages of the OFDM system.

(3) The Other Embodiments

In the first embodiment, the modulator 3 is provided on the preceding stage of the serial-parallel converter 4 in the transmitting apparatus 20, and the orthogonal phase signals I and Q which are produced by the modulator 3 are converted into parallel data in accordance with the number of code channels. However, the present invention is not limited to this but the same effects as the above can be also obtained, by such a configuration that the modulator is provided on the succeeding stage of the serial-parallel converter 4 for each code channel, and the orthogonal phase signals are produced after the separation into the code channels.

In the first embodiment, the demodulator 15 is provided on the succeeding stage of the parallel-serial converter 14 in the receiving apparatus 30, and the orthogonal phase components of the respective code channels are accumulated in accordance with time series and then demodulated. However, the present invention is not limited to this but the same effects as the above can be also obtained, by such a configuration that a demodulator is provided on the preceding stage of the parallel-serial converter 14 for each code channel (in other words, demodulators are provided on the succeeding stage of the integrators $Z_1-Z_n$, one for each), and, after demodulation on each code channel, accumulating in accordance with time series is performed.

Besides, in the above-described embodiments, both the number of the orthogonal carriers and the number of code channels are n, however the present invention is not limited to this but the same effects as the above can be also obtained, by such a configuration that the number of the orthogonal carriers and the number of code channels are different.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. In a communication system having a transmitter for communicating an input information bit string with a receiver using plural orthogonal carriers that are mutually orthogonal, said transmitter comprising an orthogonal frequency multiplex signal generator including a first serial-to-parallel converter converting the input information bit string into a plurality of parallel data strings in accordance with a number of code channels to be transmitted, a modulator for producing orthogonal phase signals from said parallel data strings from said first serial-to-parallel converters, plural second serial-to-parallel convertors for converting the orthogonal phase signals from said modulator into parallel data strings, a diffusion code generator for generating diffusion codes exclusive to said channels and multiplied, respectively, therewith, first and second adders for adding results of the multiplication in accordance with the orthogonal phases, respectively, third and fourth serial-to-parallel convertors for distributing orthogonal phase components output from said first and second adders among said respective orthogonal carriers, respectively, thereby diffusing energy of each bit of the input information bit string throughout all frequency bands of said plural orthogonal carriers, and means for multiplexing the energy of plural bits of the information bit string with respect to said each orthogonal carrier.

2. In a communication system having a receiver for communicating an input information bit string with a transmitter using plural orthogonal carriers which are mutually orthogonal, said receiver comprising:

means for receiving an orthogonal frequency multiplex signal including an energy diffusion circuit for diffusing energy of each bit of the information bit string being transmitted throughout all frequency bands of said plural orthogonal carriers and for multiplexing the energy of plural bits with respect to said each orthogonal carrier;

an orthogonal phase components extracting circuit for extracting the orthogonal phase components of said respective orthogonal carriers from said orthogonal frequency multiplex signal received in the energy diffusion circuit; and a bit string demodulating circuit for accumulating the orthogonal phase components extracted in the orthogonal phase components extracting circuit in accordance with a time series, for performing inverse diffusion with respect to each bit, and for demodulating it to recover said information bit string.

3. In a communication system for communicating an input information bit string between a transmitter and a receiver using plural orthogonal carriers which are mutually orthogonal, said transmitter comprising:

a first serial-parallel converter for converting the inputted information bit string into parallel data strings in accordance with a modulation multivalued number;

a modulator for producing orthogonal phase signals on the parallel data strings output from said first serial-parallel converter;

a second serial-parallel converter for converting said orthogonal phase signals output from said modulator into parallel data strings in accordance with a number of code channels to be transmitted;

a diffusion code generator for generating diffusion codes corresponding to the respective code channels;

plural multipliers for multiplying the parallel data strings output from said second serial-parallel converter by the diffusion code generated by said diffusion code generator;

first and second adders for adding results of multiplication of said plural multipliers in accordance with the orthogonal phases of the orthogonal phase signals, respectively;

third and fourth serial-parallel converters for distributing respectively orthogonal phase components output from said first and second adders among said respective plural orthogonal carriers; and an orthogonal frequency multiplex signal circuit for producing an orthogonal frequency multiplex signal on the basis of the orthogonal phase components distributed by said third and fourth serial-parallel converters.

4. The transmitter according to claim 3, wherein said modulator is provided, for each code channel, on a subsequent stage formed of said second serial-parallel converter.

5. In a communication system for communicating between a transmitter and a receiver using plural orthogonal carriers which are mutually orthogonal, said receiver comprising:

means for receiving a signal transmitted by the transmitter and including an orthogonal phase components extracting circuit for extracting orthogonal phase components in said each orthogonal carrier respectively, on the basis of an orthogonal frequency multiplex signal contained in a base-band signal transmitted by said transmitter;

a first parallel-serial converter for converting plural orthogonal phase components output from said orthogonal phase components extracting circuit into a first serial signal string;

a diffusion code generator for generating diffusion codes corresponding to respective transmitted code channels;

plural multipliers for multiplying the serial signal string output from said first parallel-serial converter by the diffusion codes generated by said diffusion code generator, respectively;

plural integrators for adding up results of multiplications of said multipliers, respectively;

a second parallel-serial converter for converting results of integration output from said plural integrators into a second serial signal string;

a demodulator for recovering information symbols from the orthogonal phase signals output from said second parallel-serial converter; and a third parallel-serial converter for converting the information symbols output from said demodulator into a third serial data string for producing a received information bit string.

6. The receiver according to claim 5, wherein said demodulator is provided, for every code channel, on a preceding stage of said second parallel-serial converter.

7. The transmitter according to claim 3, wherein said diffusion code generator includes:

a first diffusion code generator for generating a first diffusion code which is exclusive to each communication system;

a second diffusion code generator for generating second diffusion codes which are exclusive to the respective code channels, and means for multiplying said first diffusion code by said second diffusion codes which are exclusive to the respective code channels, thereby generating the diffusion codes corresponding to the respective code channels.

8. The transmitter according to claim 7, wherein said first diffusion code generator generates a pseudo noise code, which is represented by a maximum length linear shift register sequence code, as said first diffusion code.

9. The transmitter according to claim 7, wherein said second diffusion code generator generates a pseudo noise code, which is represented by a maximum length linear shift register sequence code, as said second diffusion code.

10. The transmitter according to claim 7, wherein
said second diffusion code generator generates an orthogonal code, as said second diffusion code.

11. In a communication system for communicating between a transmitter and a receiver using plural orthogonal carriers which are mutually orthogonal, said transmitter comprising:
- a first serial-parallel converter for converting an input information bit string into parallel data strings in accordance with a number of code channels to be transmitted;
- plural second serial-parallel converters for converting the parallel data strings output from said first serial-parallel converter into parallel data strings in accordance with a modulation multivalued number, respectively;
- plural modulators for producing orthogonal phase signals from said parallel data strings from said second serial-parallel converters;
- a diffusion code generator for generating diffusion codes corresponding to the respective code channels;
- plural multipliers for multiplying the orthogonal phase signals output from said plural modulators by the diffusion codes generated by said diffusion code generator, respectively;
- first and second adders for adding results of multiplication of said plural multipliers in accordance with the orthogonal phases, respectively;
- third and fourth serial-parallel converters for distributing orthogonal phase components output from said first and second adders among said respective orthogonal carriers, respectively; and
- an orthogonal frequency multiplex signal circuit for producing an orthogonal frequency multiplex signal on the basis of the orthogonal phase components from said third and fourth serial-parallel converters.

12. The transmitter according to claim 11, wherein said diffusion code generator includes:
- a first diffusion code generator for generating a first diffusion code exclusive to each communication system; and
- a second diffusion code generator for generating second diffusion codes exclusive to the respective code channels, and
- means for multiplying said first diffusion code by said second diffusion codes which are exclusive to the respective code channels, thereby generating the diffusion codes corresponding to the respective code channels.

13. The transmitter according to claim 12, wherein
said first diffusion code generator generates a pseudo noise code, represented by a maximum length linear shift register sequence code, as said first diffusion code.

14. The transmitter according to claim 12, wherein
said second diffusion code generator generates a pseudo noise code, represented by a maximum length linear shift register sequence code, as said second diffusion code.

15. The transmitter according to claim 12, wherein
said second diffusion code generator generates an orthogonal code, as said second diffusion code.

16. In a communication system for communicating between a transmitter and a receiver using plural orthogonal carriers which are mutually orthogonal, said receiver comprising:
- an orthogonal phase components extracting circuit for extracting respectively orthogonal phase components in said respective orthogonal carriers, on the basis of an orthogonal frequency multiplex signal contained in a base-band signal obtained by reception of a signal transmitted from said transmitter;
- a first parallel-serial converter for converting plural orthogonal phase components output from said orthogonal phase components extracting circuit into a first serial data string;
- a diffusion code generator for generating diffusion codes corresponding to the respective code channels;
- plural multipliers for multiplying the first serial data string output from said first parallel-serial converter by the diffusion codes generated by said diffusion code generator respectively;
- plural integrators for adding up results of multiplications of said plural multipliers, respectively;
- plural demodulators for recovering information symbols for each code channel respectively, on the basis of results of integration output from said integrators;
- plural second parallel-serial converters for converting the information symbols output from said demodulators into a second serial data string, and for producing information bits for the respective code channels; and
- the third parallel-serial converter for converting the information bits output from said plural second parallel-serial converters into a third serial data string, and for producing a received information bit string.

\* \* \* \* \*